Aug. 4, 1925.

H. Z. COBB 1,548,304

CUSHIONING CONNECTION FOR VEHICLE SUPPORTING SPRINGS

Filed July 11, 1924

Inventor
HENRY Z. COBB
By his Attorney

Patented Aug. 4, 1925.

1,548,304

UNITED STATES PATENT OFFICE.

HENRY Z. COBB, OF PROVIDENCE, RHODE ISLAND, ASSIGNOR TO REVERE RUBBER COMPANY, OF CHELSEA, MASSACHUSETTS, A CORPORATION OF RHODE ISLAND.

CUSHIONING CONNECTION FOR VEHICLE SUPPORTING SPRINGS.

Application filed July 11, 1924. Serial No. 725,374.

*To all whom it may concern:*

Be it known that I, HENRY Z. COBB, a citizen of the United States, residing at Providence, county of Providence, State of Rhode Island, have invented certain new and useful Improvements in Cushioning Connections for Vehicle Supporting Springs, of which the following is a full, clear, and exact description.

This invention relates to cushioning connections for vehicle-supporting springs, and has for its object the devising of a cushion connection between the frame and supporting spring of vehicles, made in sections which are secured together by a backing and pin connecting means, to provide thereby a connection having certain advantages in addition to the advantages present in the usual one-piece construction.

In addition to possessing the advantages of the one-piece cushioning connection at present in common use, the connection of the present invention possesses other advantages, principally the advantage of permitting a free angular relative movement between the blocks about an axis or axes transverse thereto when the spring flexes which is made possible through the employment of the pin connection, whereas in the prior integral structures reliance is placed solely upon the integrally formed backing for this movement. The rapid and continual flexing of the spring when the vehicle is in motion causes a continual flexing movement between the sections and backing of the integral type of connection which unduly taxes the rubber compound forming the parts, whereas in the improved structure of the present invention this tendency is overcome by providing the free hinge-like movement between the sections or blocks and backing made possible by employing separate blocks and pinning them together. A cushioning connection is accordingly provided of much longer life than the former types of connections.

As cushioning connections for vehicle springs are not subjected to equal wear in all parts thereof, a further and important advantage of the present invention resides in the provision of a cushioning connection made in separate sections that may be easily assembled so that a section that has become unduly worn may be easily replaced by a new section instead of discarding an entire connection as is necessary in integral structures.

A further advantage of the present invention is the provision of a cushioning connection formed in sections that may be molded by the employment of much less costly molds than possible where the connection is made as a one-piece integral structure.

Referring to the drawings forming a part of this specification:—

Figure 1:
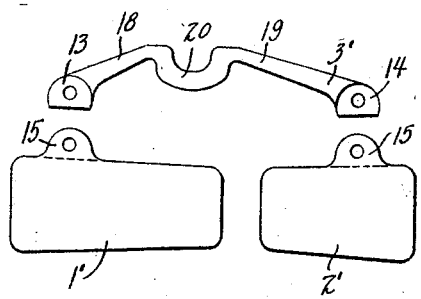
Figure 1 is a side elevation of a cushioning connection involving the present invention with the parts shown disconnected.
Figure 3:
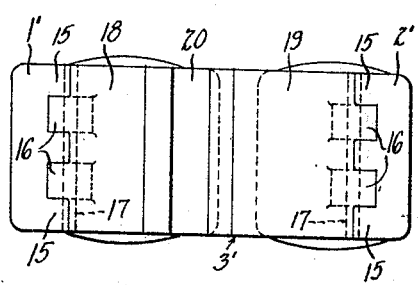
Figure 3 is a plan view of the connection.
Figure 4:
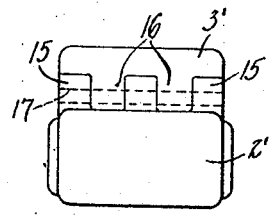
Figure 4 is an end view of the connection.

The present invention comprises cushioning connections for employment between the springs and frame of vehicles and is an improvement over the one-piece integral cushion as has already been pointed out. Types of such integral connections are shown in the patents to Masury, et al., Nos. 1,400,563 and 1,404,876. By reference to these patents it will be readily seen how the cushioning connection of the present invention may be assembled in the housing with the spring engaged thereby without the necessity of further illustrations in the present instance. It should however be here remarked for the sake of clearness, that the several views in the drawings of this application will obviously be turned from the positions in which they are shown to vertical positions quarterway around to present them as they will appear when assembled with the vehicle parts with which they will be used.

Cushioning connections for vehicle springs are usually made of solid blocks of rubber composition and for the larger types of trucks are quite large and heavy. The connections are made by placing blocks or chunks of unvulcanized rubber compound in molds, and a difficult problem is presented to thoroughly and uniformly vulcanize a block of such large dimensions, requiring, when the cushion is made in one piece as is the common practice, an intricate mold that can only be built at great expense. It is a difficult matter to distribute the unvulcanized rubber within such a complex mold structure and to apply suitable pressure thereto to insure a uniform distribution or flow of the unvulcanized rubber throughout the mold to fill every part thereof during the vulcanizing treatment so that when the vulcanization is completed a perfect article will be produced in all respects with a minimum amount of waste or overflow of the rubber from the mold. These difficulties are reduced to a minimum where the connection as in the present invention is made in sections. Each section presents a comparatively simple construction of relatively small size requiring a mold and cores of simple constructions to form it. A complete filling of the mold is also better insured with a minimum amount of overflow or waste of the rubber compound. And should a section be finished in imperfect condition the loss thus incurred will be much less than if the defect required the discarding of the entire connection as would be the case in the integral one-piece structure. Moreover, there is a much less likelihood of producing defective sections on account of the simplicity of the mold than there is in the case of the one-piece integral structure made from the complex mold.

Figure 2:
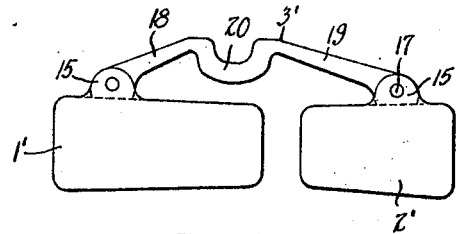
Figure 2 is a similar view with the parts connected ready for use.
Figure 5:
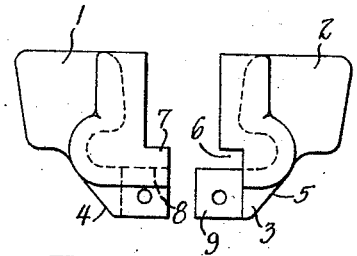
Figure 5 is a side elevation of a modified form of a cushioning connection with the parts shown disconnected.
Figure 6:
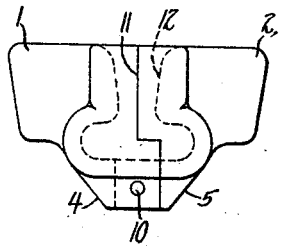
Figure 6 is a view of the modified form with the parts connected ready for use.
Figure 8:
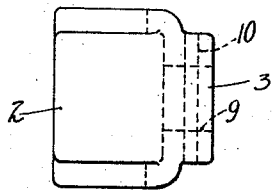
Figure 8 is an end view of the modified form.
Figure 7:
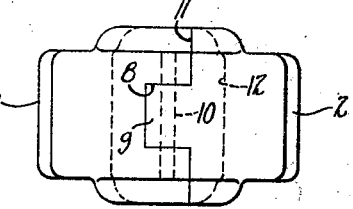
Figure 7 is a bottom plan view of the modified form.

It will be appreciated that in service the vehicle spring is subjected to a continual flexing which produces a corresponding continual compression and expansion of the various parts of the cushioning connection. The connection is furthermore subjected to a continual distortion produced by a tendency of the end of the spring to turn or rotate the cushioning block above an axis transverse to the spring. This tendency to distort or rotate the connection although slight is well illustrated in Figures 1 and 2 of the Masury et al. Patent No. 1,400,563 which shows a vehicle spring connected to a two-piece cushioning connection. Figure 1 shows the sections in an inclined position from the vertical before the spring flexes and in Figure 2 an oppositely inclined position when the spring has been flexed. This same tendency to distortion or rotation is obviously present in all types of construction and where the block is made in one piece, which is a preferable construction and a construction usually employed in practice, as shown for instance in Figure 5 of said patent, there is considerable strain placed upon the back portion connecting the upper and lower members. This continual distortion has a tendency to overtax the backing at the weakest point or a point under greatest strain.

The present invention therefore contemplates broadly the provision of a cushioning connection for a vehicle-supporting spring comprising a pair of separately vulcanized rubber-containing blocks or sections adapted for positioning, one above and the other below an end of the spring, and a pin connection for securing the blocks together to permit of a free angular relative movement between the blocks when the spring flexes at the point where the jointure is formed. A connection is thus produced having the advantages already set forth and one wherein the backing is relieved of the dangers of rupture present in the one-piece integral structure.

The structure may be provided with a single pin connection suitably positioned to produce the desired results, as for instance a pivotal connection for securing one of the blocks to an end of the backing. Or the connection may be positioned in the backing itself as shown in Figures 5 to 8. Or a plurality of connections may be employed, two such connections being shown in Figures 1 to 4 for securing the blocks to the opposite ends of the backing. The backing and connections are preferably but not necessarily made of a width substantially equal to that of the blocks or sections thereby providing a firm support to add rigidity to the connection, and in the drawings illustrating the invention the backing and pivotal connections are shown of such a width in all the views.

Referring more particularly to Figures 5 to 8, which show a cushion that may be used with either spring of the vehicle, the connection is formed of two blocks or sections 1 and 2 having a backing 3 constructed in two parts 4 and 5 formed integral respectively with the sections 1 and 2. The backing is substantially the width of the sections, the part 5 being provided with a recess 6 and the part 4 with an extension 7 for fitting within said recess. The part 4 is further provided with a slot or groove 8 and the part 5 with a mating tongue 9 which is engaged therein and secured thereto by a pivot pin 10 which passes through registering orifices in the two parts 4 and 5 to form a joint to permit of a free angular relative movement of the blocks when the spring flexes without unduly distorting the backing. The parts are suitably arranged and proportioned to preferably bring the opposite faces of the sections 1 and 2 into direct contact when in normal positions as shown at 11 in Figure 6. Each of the blocks or sections 1 and 2 are furthermore chambered out at their engaging faces to provide a housing 12 for engaging an end of the spring in the usual way, as for instance similar to that shown in Figure 5 of the Masury, et al. Patent No. 1,400,563.

Referring more particularly to Figures 1 to 4, which show a cushion especially designed for the front spring of a vehicle, the connection is formed of two blocks or sections 1' and 2' having a one-piece backing 3' pivotally connected at its opposite ends 13 and 14 respectively with the blocks 1' and 2'. The pivotal connections are provided by forming three spaced perforated lugs 15 on each of the blocks 1' and 2' and two spaced perforated lugs 16 on the respective ends 13 and 14 of the backing 3' for fitting into the spaces between the lugs 15. A pivot pin 17 is passed through the perforations in the usual way to form the joint between the sections and backing to permit of the desired angular relative movement of the blocks when the spring flexes.

The backing may be of any suitable material but is preferably of a suitable vulcanized rubber compound and preferably has a bend, which on account of the flexibility of the material permits of a relative angular movement between the portions of the backing at each side of the bend when the spring flexes. In the present instance a bent flexible backing is formed to produce the angular portions 18 and 19, and another portion 20 is provided between the ends of the backing bent in an opposite direction which facilitates the flexibility of the backing enabling it to bend more readily when occasion requires.

While but two types of construction are shown in the drawings it will be understood that there may be various forms of blocks suitable for different designs of vehicles and the manner of making the connection and of connecting the sections together will vary to best suit the particular design of cushion. For instance, the backing shown in Figures 5 to 8 may be made in one piece somewhat similar to Figures 1 to 4 using two pins if desired. Furthermore, in the constructions shown it will be noted that the joints are formed with opposed faces that produce a more or less locking of the parts so that the pin connections do not provide a free unhampered pivotal movement thereabout. In such constructions the rubber, strictly speaking, flexes or distorts due to the interfitting connections instead of the parts rotating freely about the pins as would be the case if there were sufficient play between the opposed surfaces of the joint. The invention however is intended to comprise structures providing either of these possibilities. It will be further understood that a joint may be pinned together with two or more pins if desired, the principal object in the constructions shown being to separate the rubber parts instead of making them integral thus eliminating the strain and wear at the separated portions that would take place if they were integrally formed as in the one-piece cushion.

It will be understood that the cushioning connection may be made of any suitable material as for instance vulcanized rubber composition and fibre, or rubber and plies of fabric, or other reinforcements, but usually the cushion will be made entirely of a rubber composition as is the usual practice employed in cushioning connections of this type.

As many apparently widely different embodiments of this invention may be made without departing from the spirit thereof, it is to be understood that I do not intend to limit myself to the specific forms of the invention as set forth except as indicated in the appended claims.

Having thus described my invention, what I claim and desire to protect by Letters Patent is:

1. A cushioning connection for a vehicle-supporting spring comprising a pair of vulcanized rubber-containing blocks adapted for positioning one above and the other below an end of the spring, and pivotal connecting means for securing the blocks together.

2. A cushioning connection for a vehicle-supporting spring comprising a pair of separate vulcanized rubber-containing blocks adapted for positioning one above and the other below an end of the spring, a backing for the blocks, and pivotal connecting means for securing the blocks together.

3. A cushioning connection for a vehicle-supporting spring comprising a pair of vulcanized rubber-containing blocks adapted for positioning one above and the other below an end of the spring, a backing for the blocks, and a pin connection securing a block to an end of the backing.

4. A cushioning connection for a vehicle-supporting spring comprising a pair of vulcanized rubber-containing blocks adapted for positioning one above and the other below an end of the spring, a backing for the blocks, and pin connections securing the blocks to the ends of the backing.

5. A cushioning connection for a vehicle-supporting spring comprising a pair of vulcanized rubber-containing blocks adapted for positioning one above and the other below an end of the spring, a backing for the blocks having a flexible band, and a pin connection securing a block to an end of the backing.

6. A cushioning connection for a vehicle-supporting spring comprising a pair of vulcanized rubber-containing blocks adapted for positioning one above and the other below an end of the spring, and a bent flexible backing secured at its ends to the blocks having a portion between its ends bent oppositely to the bend of the backing.

7. A cushioning connection for a vehicle-supporting spring comprising a pair of vulcanized rubber-containing blocks adapted for positioning one above and the other below an end of the spring, a bent flexible backing having a portion between its ends bent oppositely to the bend of the backing, and pivotal connections securing the blocks to the ends of the backing.

8. A cushioning connection for a vehicle-supporting spring comprising a pair of vulcanized rubber-containing blocks adapted for positioning one above and the other below an end of the spring, a backing for the blocks, and a pivotal connection, said connection being substantially the width of the block to provide a firm support therefor.

9. A cushioning connection for a vehicle-supporting spring comprising a pair of vulcanized rubber-containing blocks adapted for positioning one above and the other below an end of the spring, a backing for the blocks, and pivotal connections securing the blocks to the ends of the backing, said backing and pivotal connections being substantially the width of the blocks to provide a firm support therefor.

Signed at Providence, county of Providence, State of Rhode Island, this 8th day of July, 1924.

HENRY Z. COBB.